United States Patent
Sorenson et al.

(10) Patent No.: US 7,339,137 B1
(45) Date of Patent: Mar. 4, 2008

(54) ELECTRIC GRILLING APPLIANCE

(76) Inventors: Wally B. Sorenson, 44136 200th St., Lake Preston, SD (US) 57249; Adam Sorenson, 44136 200th St., Lake Preston, SD (US) 57249

( * ) Notice: Subject to any disclaimer, the term of this patent is extended or adjusted under 35 U.S.C. 154(b) by 255 days.

(21) Appl. No.: 10/960,654

(22) Filed: Oct. 7, 2004

(51) Int. Cl.
*A47J 37/07* (2006.01)

(52) U.S. Cl. .................. 219/386; 219/402; 219/405; 219/411; 99/425; 99/446

(58) Field of Classification Search .............. None
See application file for complete search history.

(56) References Cited

U.S. PATENT DOCUMENTS

| | | | | |
|---|---|---|---|---|
| 2,557,832 | A | * | 6/1951 | McCormick ............. 219/392 |
| 2,767,298 | A | * | 10/1956 | Fry ..................... 219/395 |
| 4,149,516 | A | | 4/1979 | Hall |
| 4,338,511 | A | | 7/1982 | Six |
| 4,392,038 | A | * | 7/1983 | Day et al. ............... 219/400 |
| 4,532,911 | A | | 8/1985 | Orter |
| 4,641,015 | A | | 2/1987 | Mayeur |
| 4,899,724 | A | * | 2/1990 | Kuechler ................ 126/41 R |
| 4,917,006 | A | | 4/1990 | Bowen et al. |
| 5,355,779 | A | | 10/1994 | O'brien et al. |
| 5,445,066 | A | * | 8/1995 | Rosset .................. 99/446 |
| 5,456,163 | A | | 10/1995 | Ceravolo |
| 5,471,916 | A | * | 12/1995 | Bird et al. .............. 99/446 |
| 5,582,094 | A | | 12/1996 | Peterson et al. |
| 5,718,165 | A | * | 2/1998 | Winstead ................ 99/446 |
| 5,719,377 | A | | 2/1998 | Giebel |
| 5,968,387 | A | * | 10/1999 | Guerrier et al. ........... 219/392 |
| 6,037,571 | A | | 3/2000 | Christopher |
| 6,104,004 | A | | 8/2000 | Ragland et al. |
| 2006/0138118 | A1 | * | 6/2006 | Chan ..................... 219/400 |

FOREIGN PATENT DOCUMENTS

| | | |
|---|---|---|
| DE | 3312041 A1 | * 10/1984 |
| DE | 29623114 U1 | * 11/1997 |
| JP | 02-279117 A | * 11/1990 |

* cited by examiner

*Primary Examiner*—J. Pelham

(57) ABSTRACT

A food heating appliance is disclosed that comprises a chamber portion and a lid portion that defines a heating chamber. The chamber portion has a perimeter wall extending about the heating chamber and an upper opening into the heating chamber. The perimeter wall is insulated to permit walls are A heating apparatus in the heating chamber comprises a heating element positioned in the heating chamber adjacent to the perimeter wall, and a shield positioned above the heating element to block debris from falling on the heating element. The shield may be sloped downwardly from the perimeter wall toward a center of the heating chamber. A holding tray for smoking material may be positioned adjacent to the heating element. A drip collection tray may be positioned at the bottom of the heating chamber that influences air flow into the heating chamber. Temperature control circuitry provides precise, predictive heating of the food.

19 Claims, 10 Drawing Sheets

ELECTRIC GRILLING APPLIANCE

BACKGROUND OF THE INVENTION

1. Field of the Invention

The present invention relates to cooking appliances and more particularly pertains to a new electric grilling appliance for cooking food cleanly and effectively with a minimum of smoke generation that permits the use of the appliance in enclosed spaces.

2. Description of the Prior Art

Grilling is a highly desirable way of cooking food as grilling imparts a unique taste and health benefits to the food that are difficult to achieve with other methods of food preparation. However, grilling has traditionally been performed with fire to achieve the desired grilled food flavor, but the use of fire has a number of fairly evident drawbacks, including, but not limited to, the presence of an open flame, the large amount of heat that is generated and creates high temperatures (that is dissipated into the immediate environment), and the smoke that results when juices from the food come into contact with the flame or the heated surfaces of the grill apparatus. These factors can also apply to known electric grilling apparatus, and have made grilling a decidedly warm weather, out-of-doors activity that is limited by the presence of cold weather or precipitation, and for apartment or dormitory dwellers, the lack of an out-of-doors space where a grilling apparatus may be set up.

While some indoor grilling apparatus, such as those sold under the GEORGE FOREMAN trademark, have become popular, these types of grilling apparatus generally have an open character that releases a large amount of heat into the immediate environment of the grilling apparatus and exposes hot surfaces to the user and those around the user during the cooking process. Further, the direct contact between the grilling surfaces and the food being grilled can require a significant amount of clean up. Further, if a number of different food items are being grilled on the grilling apparatus at the same time, the flavors of the food can transfer between the foods, which sometimes is desirable but in many cases is to be avoided.

In these respects, the electric grilling appliance according to the present invention substantially departs from the conventional concepts and designs of the prior art, and in so doing provides an apparatus primarily developed for the purpose of cooking food cleanly and effectively with a minimum of smoke generation that permits the use of the appliance in enclosed spaces.

SUMMARY OF THE INVENTION

In view of the foregoing disadvantages inherent in the known types of known cooking appliances in the prior art, the present invention provides a new electric grilling appliance wherein the same can be utilized for cooking food cleanly and effectively with a minimum of smoke generation that permits the use of the appliance in enclosed spaces.

To attain this, the present invention generally comprises a food heating appliance that comprises a chamber portion that defines a heating chamber with an upper opening into the heating chamber, and a perimeter wall that extends about the heating chamber. The appliance also includes a lid portion for selectively closing the upper opening of the chamber portion. A heating apparatus is positioned in the heating chamber for heating the heating chamber. The heating apparatus comprises a heating element positioned in the heating chamber adjacent to the perimeter wall, and a shield positioned above the heating element to block debris from falling on the heating element. The heating element may be mounted on the perimeter wall of the chamber portion, and the shield may be mounted on the perimeter wall of the chamber portion at a location above the heating element. The shield may be sloped downwardly from the perimeter wall toward a center of the heating chamber.

The perimeter wall may include a pair of side walls that are located on opposite sides of the heating chamber, and the heating apparatus may include a pair of heating elements and a pair of shields, with a first one of the heating elements and a first one of the shields being located on an opposite side wall of the chamber portion from a second one of the heating elements and a second one of the shields.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the electric grilling appliance of the present invention is the efficiency of the appliance in heating the food item to a desired temperature in a highly controlled manner that does not overheat or burn or dry out the food being cooked. The appliance has the ability to grill food items in a virtually smoke-free manner using a minimal volume of air flow such that the food is efficiently heated with a minimal loss of heat to the environment of the appliance, but also with minimal drying of the food due to excess air flow. Further, smoking of the food being cooked is facilitated by a smoking material holding tray located near the heating elements.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
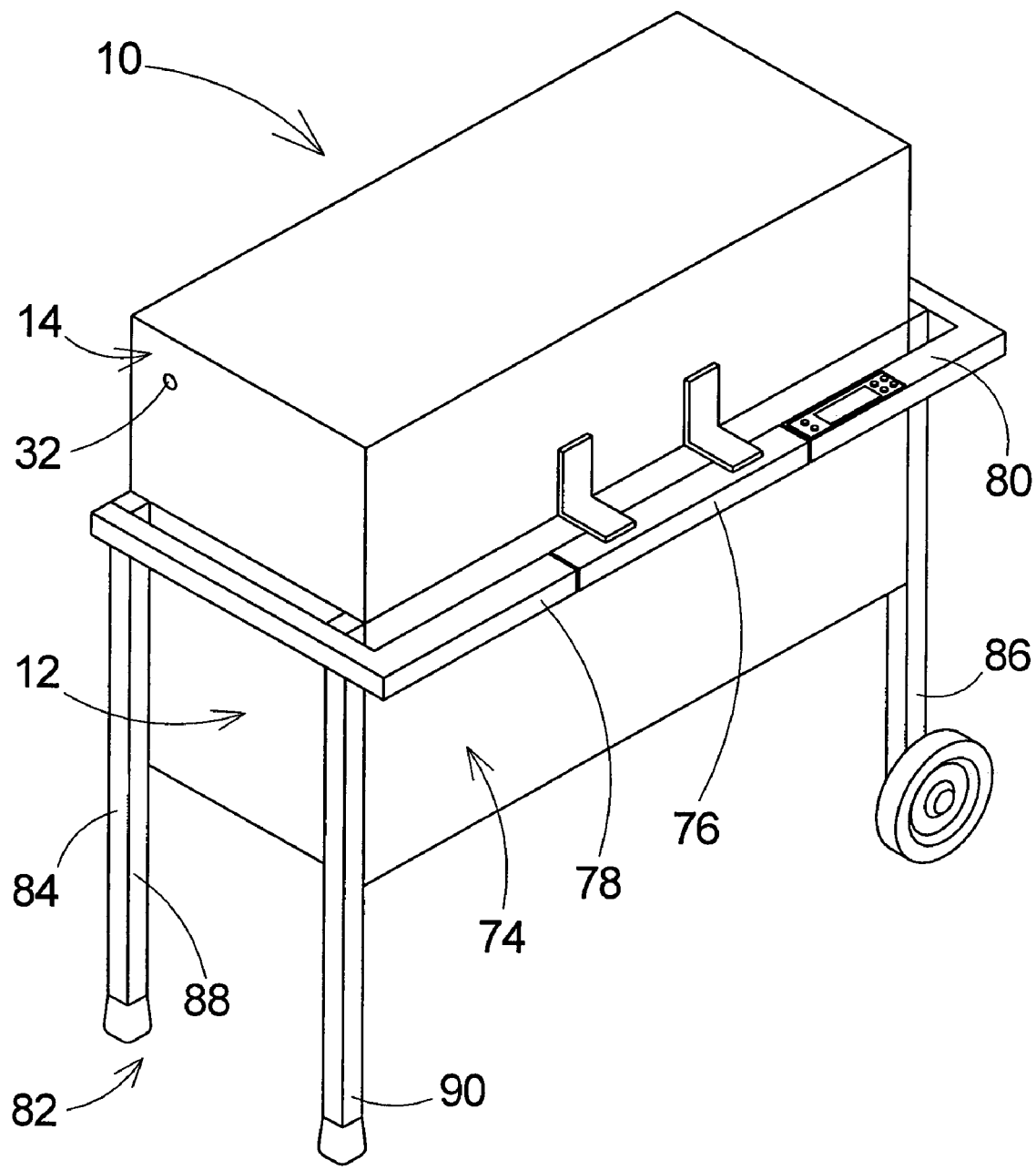
FIG. 1 is a schematic perspective view of the new electric grilling appliance according to the present invention.
Figure 2:
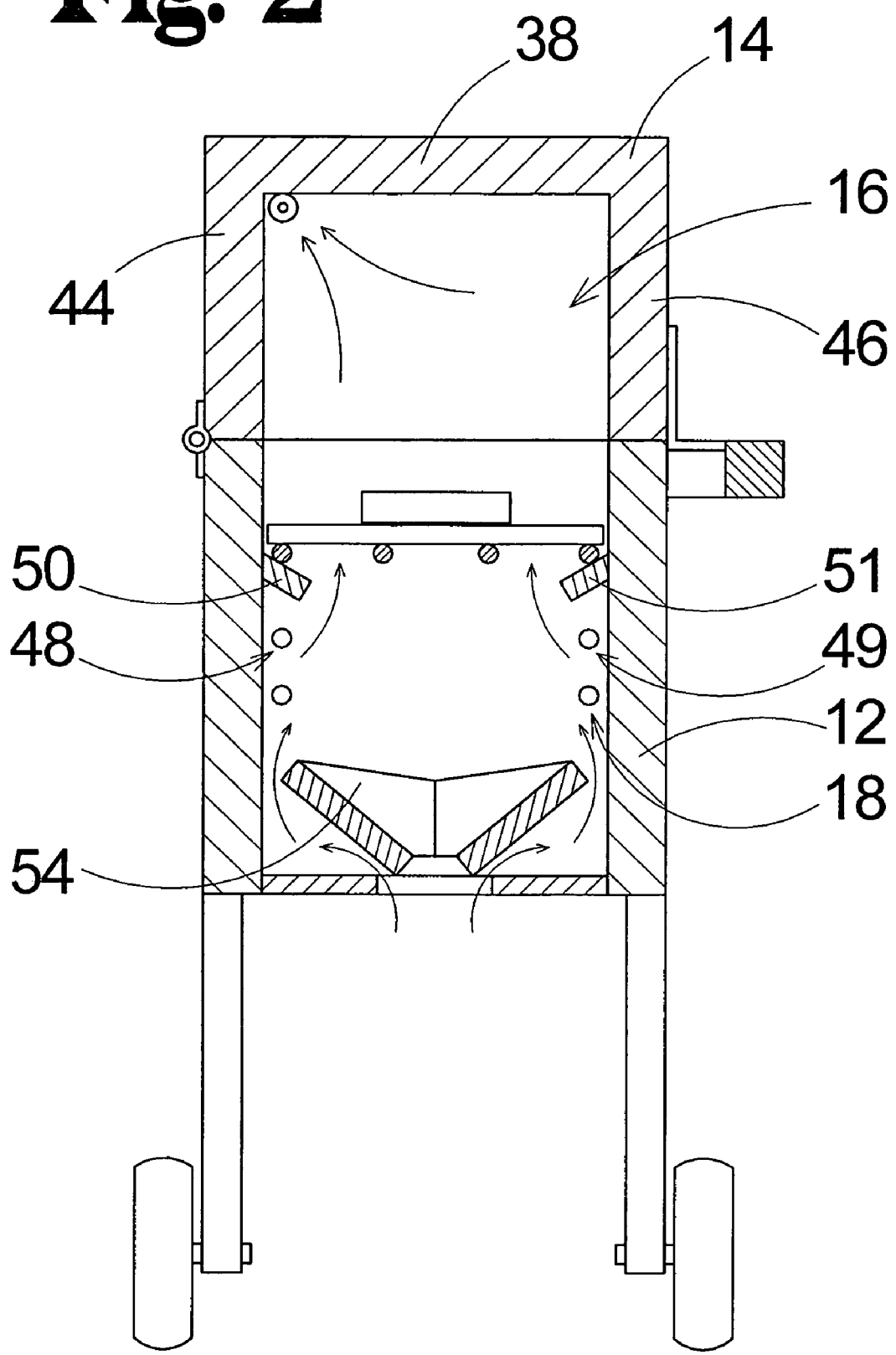
FIG. 2 is a schematic transverse sectional view of the present invention with the lid portion in a closed condition.
Figure 3:
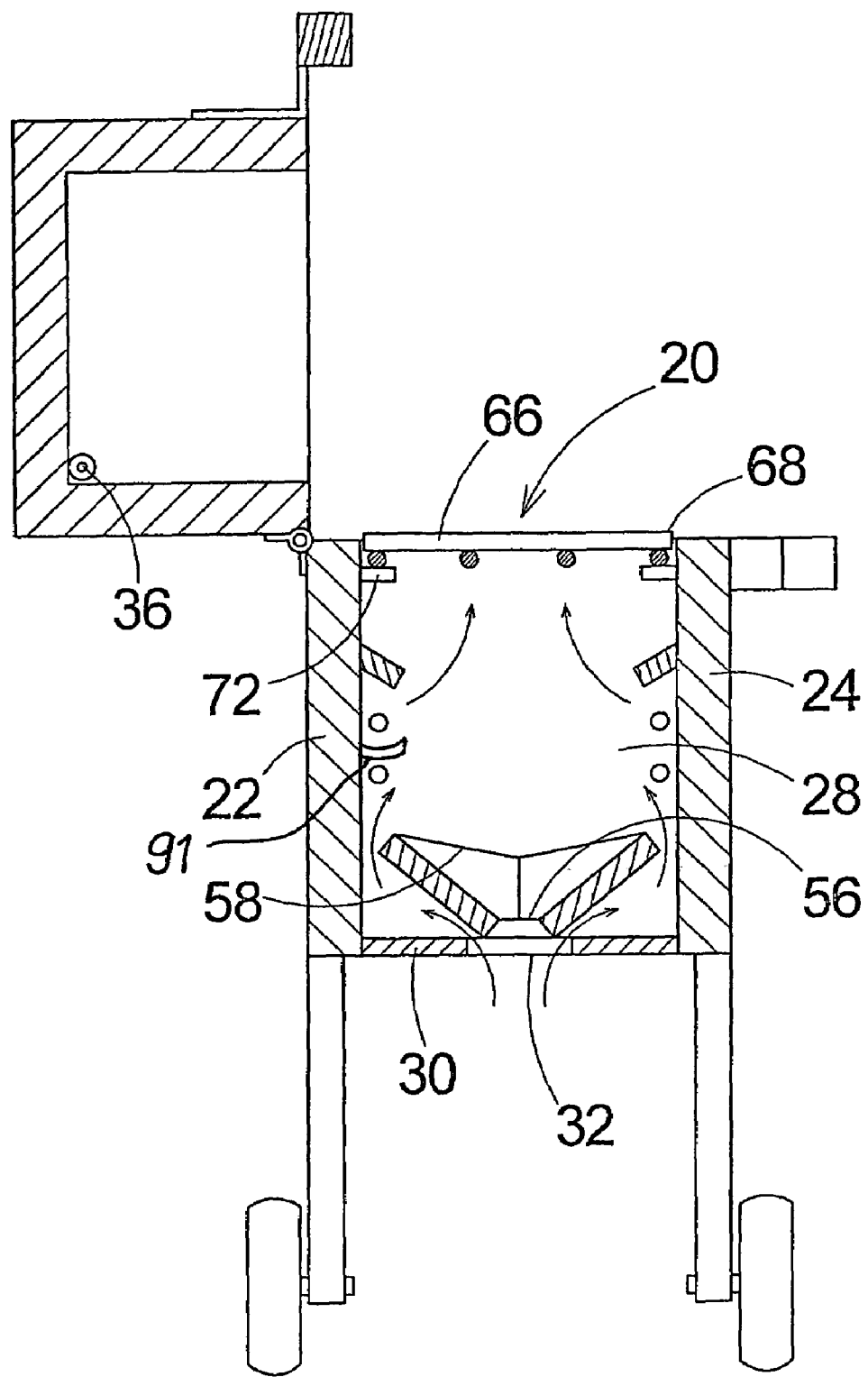
FIG. 3 is a schematic transverse sectional view of the present invention with the lid portion in an open condition.
Figure 4:
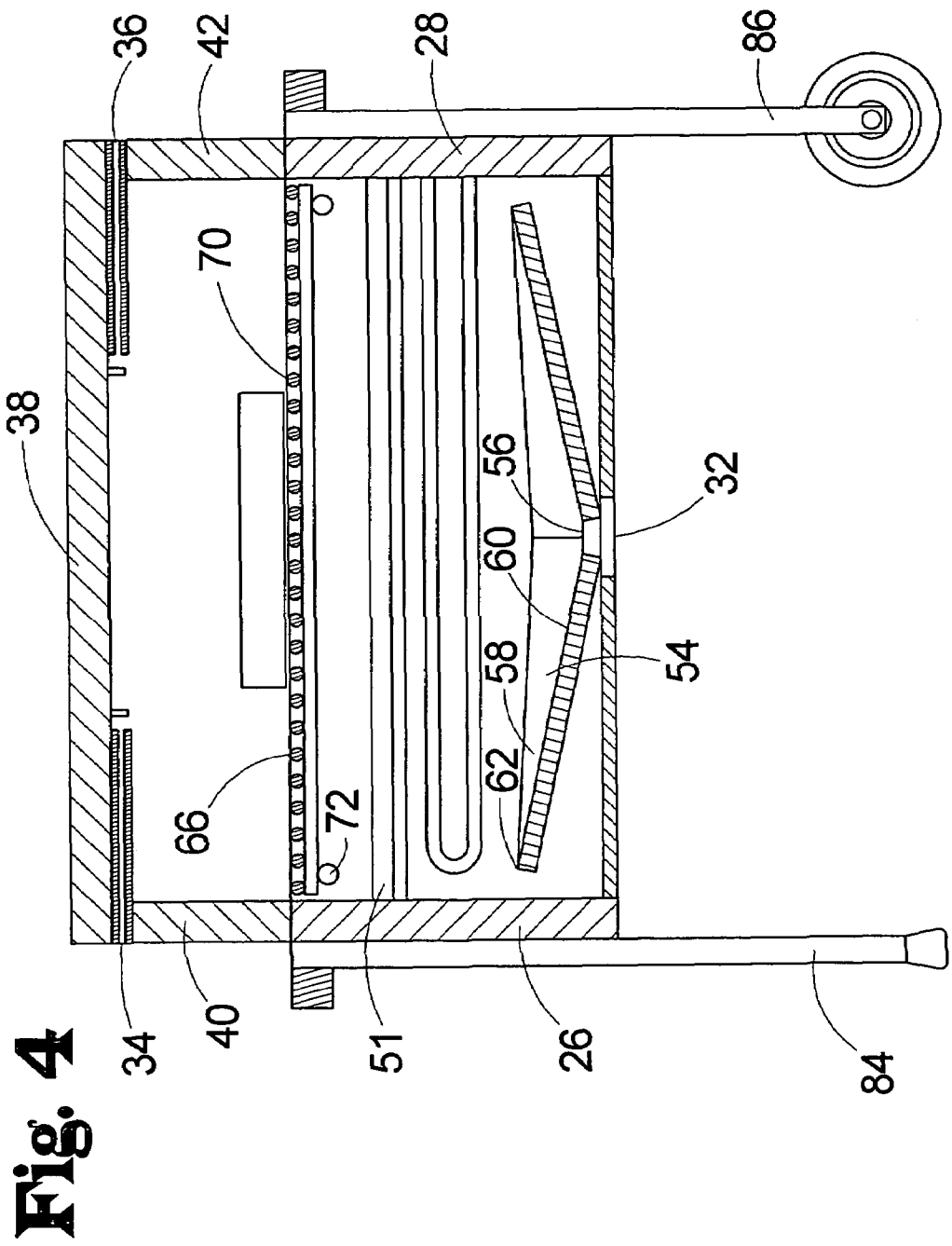
FIG. 4 is a schematic longitudinal sectional view of the present invention.
Figure 5:
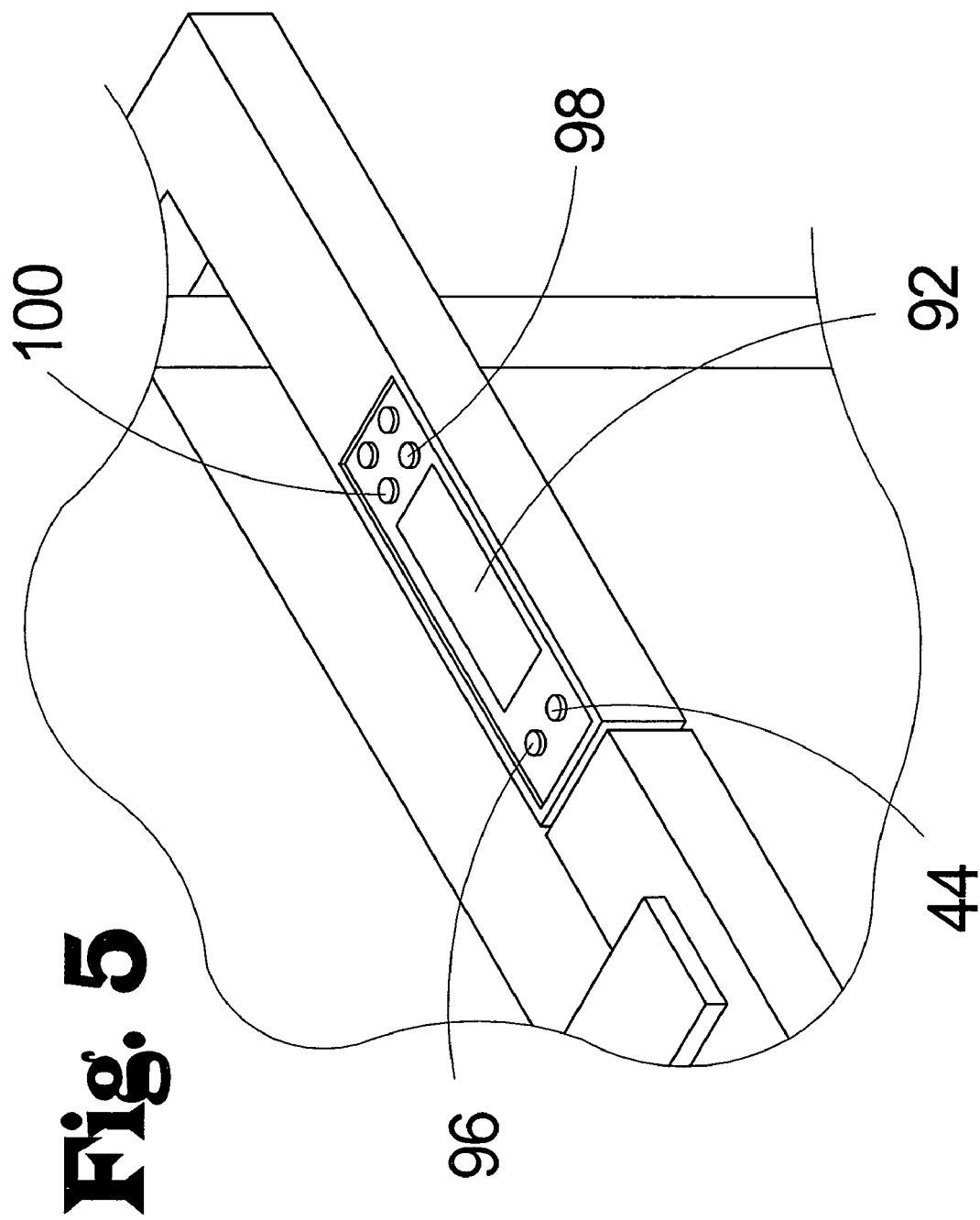
FIG. 5 is a schematic top view of the controls of the present invention.
Figure 6:
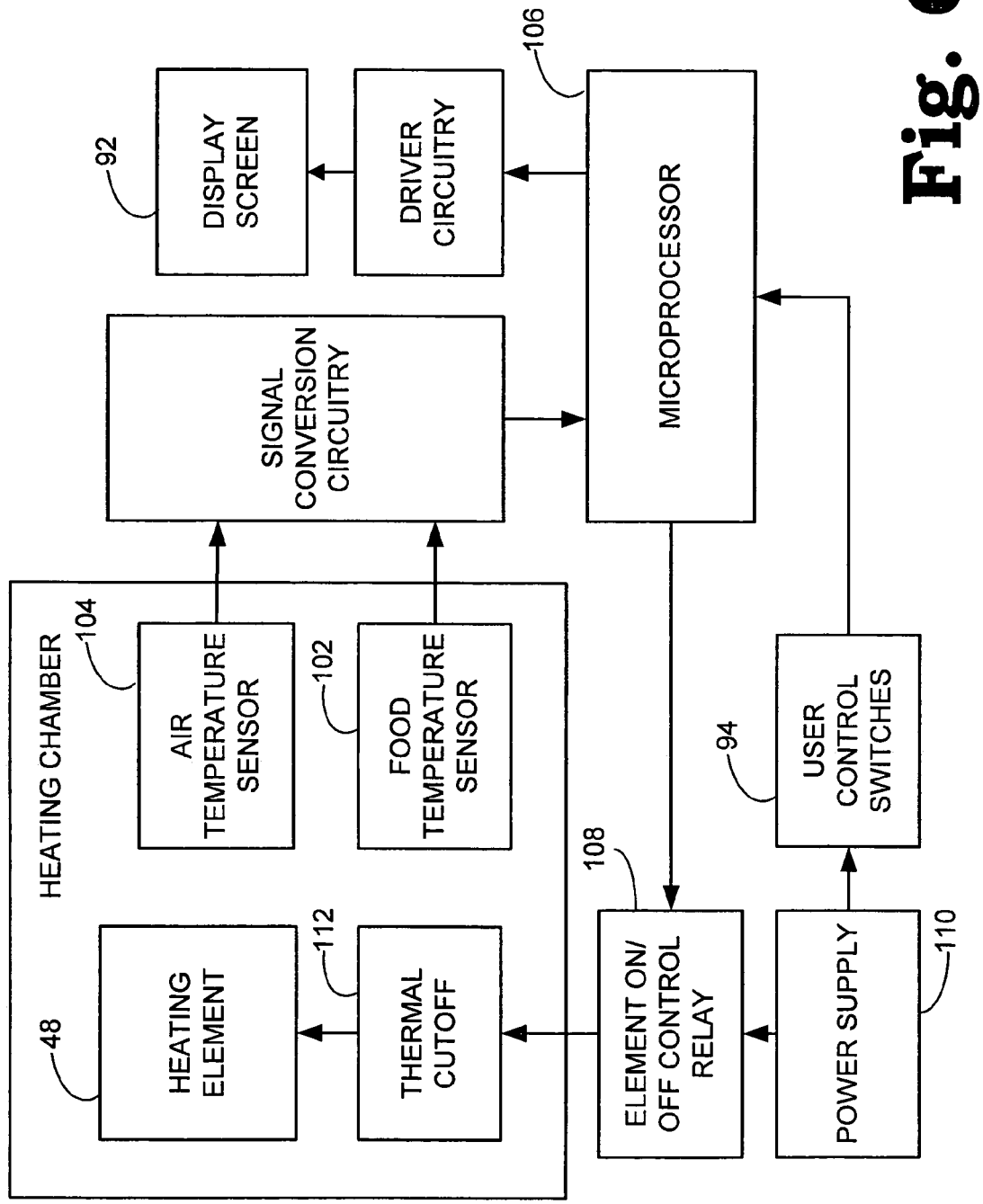
FIG. 6 is a schematic diagram of control circuitry of the present invention.

With reference now to the drawings, and in particular to FIGS. 1 through 10 thereof, a new electric grilling appliance embodying the principles and concepts of the present invention and generally designated by the reference numeral 10 will be described.

As illustratively shown in FIGS. 1 through 5, the food heating and grilling appliance 10 of the invention generally includes a chamber portion 12 and a lid portion 14 that define a heating chamber 16 for receiving an item of food to be heated, in which a heating apparatus 18 is positioned.

The chamber portion 12 defines a lower section of the heating chamber 16, and has an upper opening 20 that opens into the heating chamber 16. In the illustrative embodiment of the invention, the chamber portion 12 may comprise a perimeter wall 22 that defines the upper opening 20 and extends about the heating chamber 16. The perimeter wall 22 comprises a pair of side walls 24, 26, and a pair of end walls 28, 30. The walls 22, 24, 26, and 28 of the chamber portion 12 may be configured into a substantially rectangular cross sectional shape, although other configurations may be employed. The side walls 24, 26 and end walls 26, 28 may be comprised of a thermally insulating material positioned between panels of a more durable material, such as a metal. The use of the insulating material in the walls provides the benefits of keeping much of the exterior surface of the chamber portion and the lid portion relatively cool, and also permits a common household power level (for example approximately 120 volts and approximately 15 amps) to create sufficient heat in the heating chamber to cook the food in the heating chamber. Further, the use of the insulating material is believed to permit a larger cooking area to be heated using the preferred heating apparatus 18.

The chamber portion 12 may also comprise a bottom wall 30 that extends below the heating chamber 16, and may extend between the sections of the perimeter wall 22. The bottom wall 30 may have an aperture 32 for permitting air to flow into the heating chamber 16 from below the chamber portion 12. The aperture 32 may be substantially centrally located on the bottom wall 30 of the chamber portion 12. Optionally, the bottom wall 30 may lack the insulation of the other walls of the chamber portion 12.

The lid portion 14 of the appliance 10 functions to selectively open and close the upper opening 20 of the chamber portion 12. The lid portion 14 may be pivotally mounted on the chamber portion 12 for movement between an open position in which the upper opening is closed, and a closed position in which the upper opening is closed. The lid portion 14 may define an upper portion of the heating chamber 16. The lid portion 14 may comprise a top wall 38, a pair of end walls 40, 42, and a pair of side walls 44, 46, and preferably these walls are insulated similar to the walls of the chamber portion 12. Optionally, a gasket (not shown) may be positioned between the respective walls of the chamber portion 12 and the lid portion 14 when the lid portion 14 is closed on the chamber portion.

At least one vent 34, and illustratively two vents 34 and 36, are provided to permit a limited quantity of air to pass through the lid portion 14 to the exterior of the appliance 10. The escaping air is replaced by air coming through the aperture 32 in the bottom wall 30 of the chamber portion 12. The vents 34, 36 extend through the lid portion 14 between the heating chamber 16 and an exterior surface of the lid portion 14. Preferably, but not critically, the vents 34, 36 are located in the ends walls 40, 42 of the lid portion 14, and the interior entrances to the vents are located toward the center of the side walls 44, 46 of the lid portion to promote a more central air flow through the heating chamber 16. The vents 34, 36 may be formed of a tube that extends through the wall of the lid portion 14 and extends into the interior of the heating chamber 16. Optionally, a shield may be positioned adjacent to the inner entrances of the vents to further reduce or constrict the opening and minimize air flow through the vent. As a further preferred structure, the area of the opening of the vents 34, 36 is relatively small in comparison to the cross sectional area of the heating chamber in a plane in which the food is supported (e.g., a plane in which the grill extends). For example, each of the vents 34, 36 may have a combined area of approximately one square inch (approximately 6.5 square cm) or less.

The heating apparatus 18 is positioned in the heating chamber 16 for the function of heating air in the heating chamber. In the illustrative embodiment of the invention, the heating apparatus 18 includes a heating element 48 that is positioned in the heating chamber, and most preferably is positioned adjacent to the perimeter wall 22 of the chamber portion 12. The heating element 18 may be mounted on the perimeter wall 22 of the chamber portion 12, and may be mounted on one of the side walls 24, 26 of the perimeter wall. In the most preferred embodiments of the invention, the heating element 48 comprises an electrical heating element, although it is possible that heating elements utilizing other fuel sources, such as a flammable gas or even wood, might be used.

The heating apparatus 18 may also comprise a shield 50 that is positioned above the heating element 48 to block debris from falling on the heating element to avoid the creation of smoke when the debris strikes the hot surface of the heating element 18. The shield 50 may be mounted on the perimeter wall 22 of the chamber portion 12, such as on one of the side walls 24, 26 of the perimeter wall 22. The shield 50 may be sloped downwardly from the perimeter wall 22 toward a center of the heating chamber 16. In the most preferred embodiments of the invention, the heating apparatus 18 includes a pair of heating elements 48, 49 and a pair of shields 50, 51, with a first one 48 of the heating elements and a first one 50 of the shields being located on a side wall 24 of the chamber portion 12 that is opposite of a second one 49 of the heating elements and a second one 51 of the shields.

The appliance 10 may also include a drip collection tray 54 that is positioned in the heating chamber 16, and may be removable from the heating-chamber for ease of cleaning, if needed. Preferably the tray 54 is positioned low in the heating chamber 16 and below the heating apparatus 18, which facilitates keeping the temperature of the drip collection tray 54 relatively lower than if the tray were positioned higher up in the heating chamber 16 and thus reduces the possibility of smoke being generated if drippings from the food being cooked strikes the tray 54. The smoke may carry irritants that are annoying and carcinogens that are dangerous. In at least some embodiments of the invention the drip collection tray 54 is positioned above and adjacent to the bottom wall 30, and may rest on the bottom wall. The drip collection tray 54 may have a central hole 56 that is positioned above the aperture 32 in the bottom wall 30. The drip collection tray 54 may have a perimeter region 58 that surrounds a central region 60 of the tray 54. The central region 60 may be at a relatively lower vertical level than the perimeter region 58 to cause debris to move toward the central hole 56 in the central region 60. The drip collection tray 54 may have a perimeter edge 62, and the perimeter edge 62 may be positioned adjacent to the perimeter wall 22 of the chamber portion 12. The perimeter edge 62 may be spaced from the perimeter wall 22 a small distance (e.g., less than approximately 0.5 inches (approximately 1.25 cm)) to permit air to move between the perimeter edge 62 and the perimeter wall 22.

The combination of the aperture 32 in the bottom wall 30 and the spacing between the perimeter edge 62 of the tray 54 and the interior walls of the heating chamber 16 permits a flow of make up air (for the air leaving the vents 34, 36) to enter the heating chamber 16. As the make up air flows about the drip collection tray 54, heat from the tray 54 is absorbed by the entering air, which functions to cool the tray 54 and preheat the incoming air. The relatively small size of the vents 34, 36 controls the volume of air that can move into the heating chamber 16, which minimize the flow of air into the chamber and minimizes the drying effect of the air movement on the food being cooked.

A grill assembly 64 may be included in the appliance 10 of the invention for supporting items of food in the heating chamber 16. The grill assembly 64 may comprise a grill 66 having an outer perimeter frame 68 defining a central opening and a plurality of bars 70 that extend across the central opening of the perimeter frame. The grill assembly may also include means for removably mounting the grill in the heating chamber, which may be located on the chamber portion 12 of the appliance 10. Preferably, the grill mounting means is configured to support the grill at two different vertical levels in the heating chamber. In one embodiment of the invention, the grill mounting means comprises an upper support assembly which includes a plurality of pegs 72. Each of the pegs 72 may be mounted on the perimeter wall 22 of the chamber portion 12 and may extend inwardly into the heating chamber 16. Significantly, the shield 50 of the heating apparatus 18 may form a lower support for supporting the grill in a relatively lower vertical position than the pegs 72 of the upper support assembly. Thus, the upper support assembly is located at a greater distance from the heating element 18 than the lower support formed by the shield. The adjustment in the vertical height of the grill 66 permits the accommodation of relatively larger food items in the heating chamber 16.

The appliance may also include a handle assembly 74. The handle assembly 74 may include at least two segments. The handle assembly may include a lid handle segment 76 that is mounted on the lid portion 14, and may extend in a forward direction from the lid portion 14. The handle assembly 74 may also include a pair of chamber handle segments 78, 80 that are each mounted on the chamber portion 12. The pair of chamber handle segments 78, 80 may each be mounted on one of the end walls 28, 30 of the chamber portion 12. In the illustrative embodiment of the invention, the lid handle segment 76 is positioned between the pair of chamber handle segments 78, 80 when the lid portion 14 is in the closed position.

A leg assembly 82 may be removably mounted on the chamber portion 12 of the appliance 10 for supporting the chamber portion 12 above a surface, such as the ground or a floor. The leg assembly 82 may include a pair of leg sets 84, 86. Each of the leg sets 84, 86 may be mounted on one of the end walls 28, 30 of the chamber portion 12. Each of the legs sets 84, 86 may comprise a pair of legs 88, 90, and the pair of legs may be mounted on one of the chamber handle segments 78, 80. Optionally, the leg assembly 82 may removable from the chamber portion 12 to facilitate transport and storage, or placement of the chamber portion 12 on a raised support surface such as a countertop.

As an option, the food grilling appliance 10 may include a smoking material holding tray 91 that may be removable from the heating chamber 16. The smoking material holding tray 91 may be positioned adjacent to at least one of the heating elements 48, 49 for holding a suitable smoking material, such as wood chips, in a manner so that the smoking material can be heated by the heating elements. In one preferred embodiment, the holding tray 91 is positioned below at least a portion of the heating element 48, and may be positioned between two sections of the heating element 48, although other positions proximate to the heating elements may also be used. The holding tray 91 preferably does not touch the heating element 48. The smoking material holding tray 91 of the invention creates smoke for imparting a smoked flavor to the food being cooked. The restricted air flow through the heating chamber 16 is believed to suppress any burning of the smoking material without having to soak the smoking material prior to placing the material in the holding tray 91.

As illustratively shown in FIGS. 6 through 10, the invention includes means for controlling the supply of power to the heating apparatus 18 that may be responsive to the temperature of the air in the heating chamber 16, but also to the internal temperature of the food being cooked, so that the food may be heated to the desired temperature without greatly exceeding that desired temperature since the internal temperature of the food item is different from the air temperature in the heating chamber 16. The means for controlling the supply of power to the heating apparatus may thus include a user interface assembly that includes a display screen 92 and a plurality of control switches or buttons 94, 96, 98, and 100. Illustratively, the control assembly is integrated into the handle assembly 74 for convenient access. The control means may also include means for detecting temperature within the heating chamber 16, including a temperature transducer or probe 102 that is removably insertable into an item of food located in the heating chamber in order to contact the interior of the food item and be able to sense and detect that temperature. Optionally, the temperature detection means may also include an air temperature sensor 104 for additionally detecting the temperature of the air inside the heating chamber 16. The signals from the sensors 102, 104 are processed as needed and directed to a microprocessor 106. The microprocessor 106 receives input from the user control switches 94-100 and outputs data to the display 92, and also communicates through suitable circuitry to a relay 108 that controls the supply of electrical power to the heating elements 48, 49 from a power supply or source 110. Optionally, thermal cutoff circuitry 112 may be included to directly shutoff the supply of power to the heating elements 48, 49 if a predetermined temperature is exceeded in the heating chamber 16 (should, for example, the power control circuitry fail) as a safety measure.

The means for controlling the heating of the heating elements of the invention permits the heating apparatus to not only cook the food, but also to warm (or maintain an intermediate temperature of) the food after it has been cooked. The cooking of the food can also be conducted in a predictive manner, through the use of the probe 102 and the processor 106.

Figure 7:
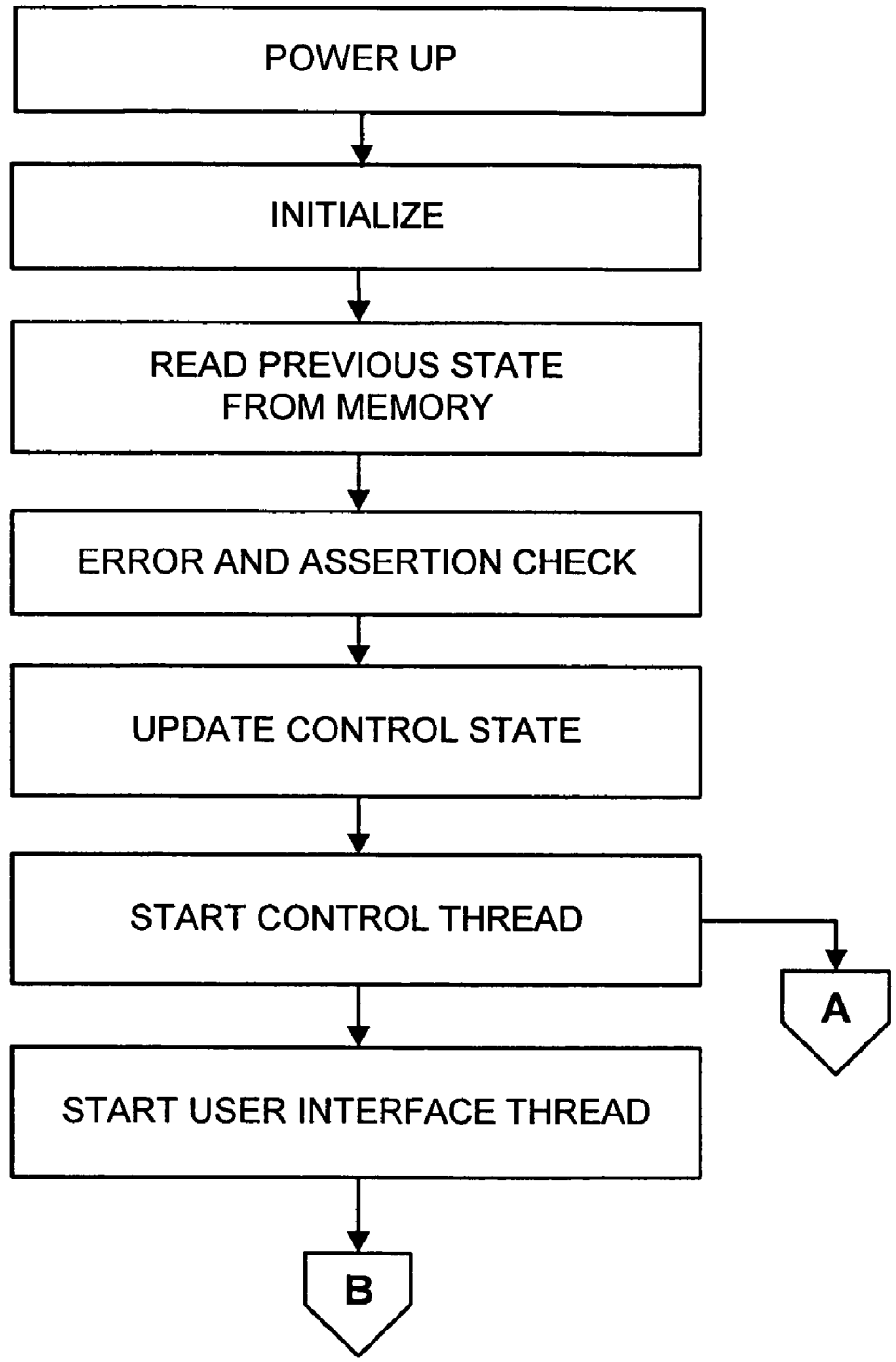
FIG. 7 is a schematic flowchart of an initial control thread of the present invention.

FIG. 7 of the drawings shows an illustrative initializing process for the invention that may be executed at initial power up of the electric grilling apparatus 10 of the invention, and which may initiate the operation of various control threads by the microprocessor.

Figure 8:
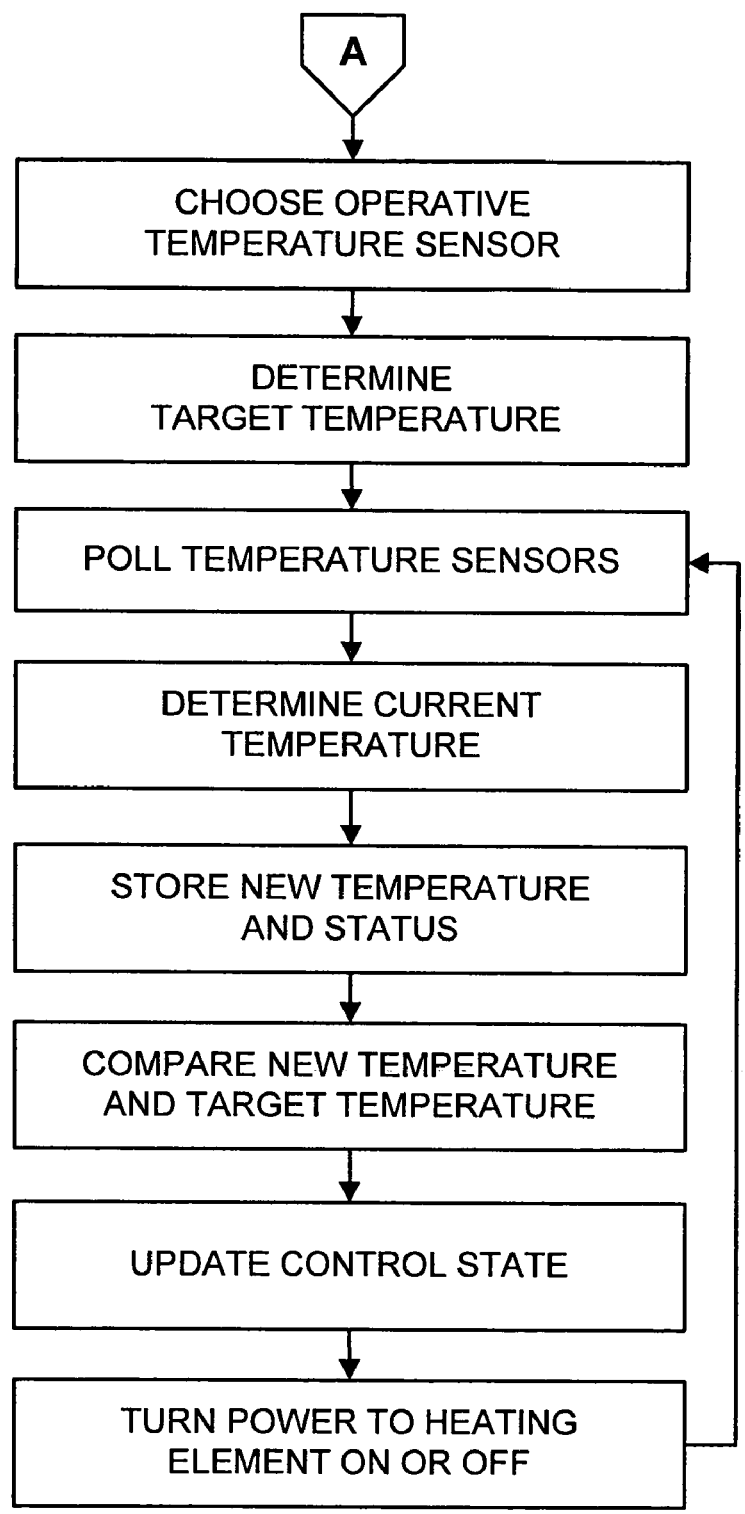
FIG. 8 is a schematic flowchart of a main control thread of the present invention.

FIG. 8 of the drawings shows an illustrative control process of the invention that may be executed after an initializing process has been executed at initial power up, and which monitors the target or desired temperature of the food and the current temperature of the food (or the air in the heating chamber) and adjusts the supply of power to the heating elements 48, 49 on a periodic basis to achieve the target temperature in the food being cooked.

Figure 9:
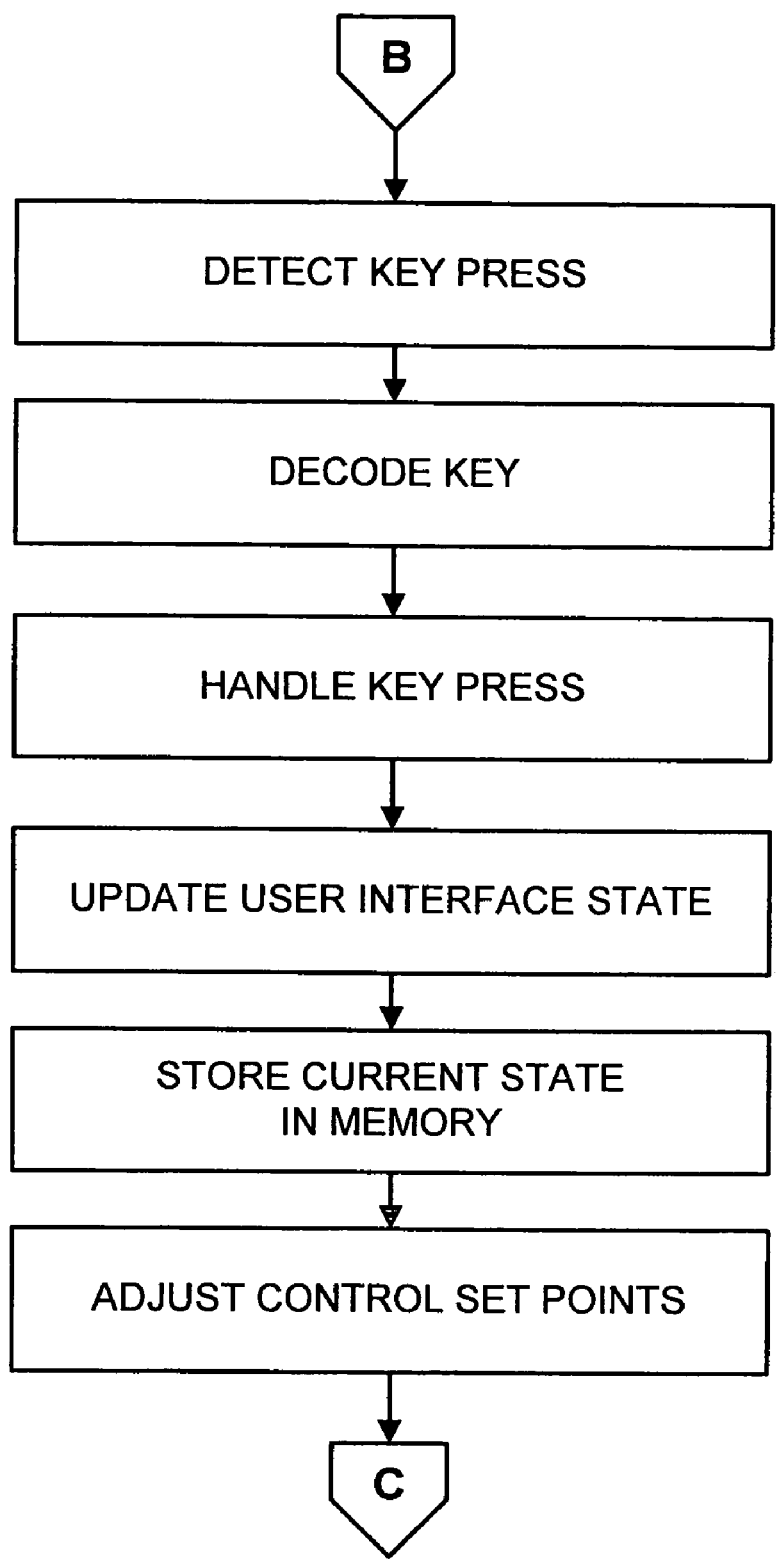
FIG. 9 is a schematic flowchart of a user interface control thread of the present invention.

FIG. 9 of the drawings shows an illustrative process for monitoring and administering the user controls, such as switches 94 through 100, and user commands entered by the user through the controls.

Figure 10:
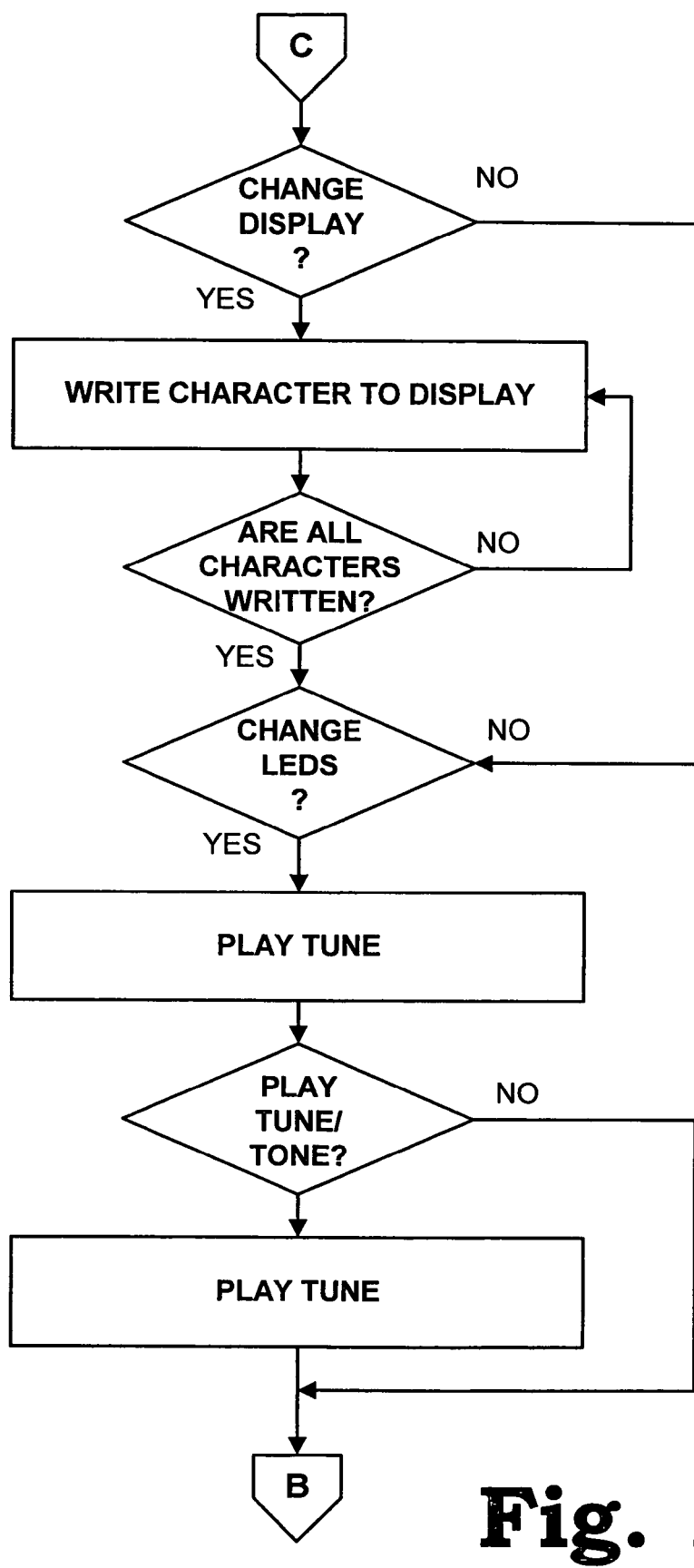
FIG. 10 is a schematic flowchart of a further portion of the user interface control thread of the present invention.

FIG. 10 of the drawings shows an illustrative process for controlling an output means, such as display screen 92, for conveying information to the user. An optional audible signaling means my also be controlled for signaling the user in an audible, and non-visual manner.

The microprocessor 106 may execute a software control program that executes the processes disclosed above and in the drawings, and may also execute several additional optional processes that provide additional operational features. These additional operational features include, but are not necessarily limited to, heating the food item only until a target temperature is reached by an internal portion of the food item. Another operational feature that the invention may include is requiring a constant actuation of the on power button (and optionally the off power button) for a predetermined period of time in order to either turn the power on or off (and otherwise ignoring the power on or off command). Still another operational feature that the invention may include is shutting off the power to the heating elements after a predetermined maximum period of time (such as, for example, five hours). The invention may include an operational feature that requires that the user make certain selections from a user menu before power is supplied to the heating elements (and not automatically supplying power to the heating elements at power on). Further, an operational feature that the invention may include the ability to resume a previous, interrupted cooking processor program that is interrupted, for example, by a loss of power to the grilling appliance 10, when the power is again supplied to the appliance and the user initiates the resumption of power. In some implementations of this optional operational feature, the previous cooking process may not be resumed if a predetermined maximum period of time is exceeded (such as, for example, after 30 minutes or an hour). Also, when provided a desired time period for cooking the food item, the invention may heat the food item at a rate calculated to reach the desired or target temperature at the end of the time period. The invention may be suitably programmed to indicate the time for reaching the target temperature by the food item based upon the initial portion of the heating process and the heating rate observed in that initial heating of the food item. The invention may also be configured to sense if the food temperature probe is currently connected or disconnected. The invention may further include means for detecting a short circuit, and may be implemented through the detection of a non-zero potential between the housing and the neutral power lead.

In actuating the buttons of the control, a protocol may established, such as for the "power on" and "power off" commands that requires the buttons to be actuated for a minimum amount of time for the command to be effective. For example, the user may be required to hold the "on power" button down for a minimum amount of time of 3 seconds for the command to be executed and the power actually supplied to the components of the control apparatus. Further, the "on power" command may not automatically cause power to be supplied to the heating apparatus 18, but the user may be required to take certain additional steps to cause the heating apparatus to be supplied with power, such as negotiating through a menu.

Optionally, the temperature transducer sensors 102, 104 may communicate with the power controlling circuitry through means other than wires, e.g., wirelessly. As a further option, a rotisserie (not shown) may also be employed in the appliance 10 of the invention, and a transparent window may be incorporated into the lid portion 14.

In some more preferred embodiments of the invention, the size of the aperture 32 in the bottom wall 30 is greater than the size of the central hole 56 in the drip collection tray 54 to facilitate air flow through the aperture 32 and below the drip collection tray 54 and around the perimeter edge 62 of the drip collection tray 54.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A food heating appliance comprising:
    a chamber portion defining a heating chamber with an upper opening into the heating chamber, the chamber portion including a perimeter wall extending about the heating chamber;
    a lid portion for selectively closing the upper opening of the chamber portion; and
    a heating apparatus positioned in the heating chamber for heating the heating chamber, the heating apparatus comprising:
        a heating element positioned in the heating chamber adjacent to the perimeter wall, and a shield positioned above and over the heating element so that the shield blocks falling debris from falling on the heating element;

wherein the perimeter wall includes a pair of side walls located on opposite sides of the heating chamber, and wherein the heating apparatus includes a pair of heating elements and a pair of shields, a first one of the heating elements and a first one of the shields being located on an opposite side wall of the chamber portion from a second one of the heating elements and a second one of the shields.

2. The appliance of claim 1 wherein the shield of the heating apparatus is sloped downwardly from the perimeter wall toward a center of the heating chamber.

3. The appliance of claim 1 additionally comprising a drip collection tray positioned in the heating chamber.

4. The appliance of claim 3 wherein the drip collection tray has a central hole positioned above the aperture in the bottom wall, the drip collection tray having a perimeter region surrounding a central region, the central region being at a lower vertical level than the perimeter region to cause debris to move toward the central hole in the central region.

5. The appliance of claim 1 additionally comprising a grill assembly for supporting food in the heating chamber, the grill assembly comprising a grill and grill mounting means for removably mounting the grill in the heating chamber, the grill mounting means being configured to support the grill at least two heights above the heating element of the heating apparatus.

6. The appliance of claim 1 additionally comprising a handle assembly comprising at least two segments, including:
a lid handle segment mounted on the lid portion;
a pair of chamber handle segments mounted on the chamber portion.

7. The appliance of claim 6 wherein the lid handle segment is positioned between the pair of chamber handle segments when the lid portion is in a closed position.

8. The appliance of claim 1 additionally comprising a leg assembly removably mounted on the chamber portion.

9. The appliance of claim 8 wherein the leg assembly comprises a pair of leg sets, each of the leg sets being mounted on one of the end walls of the chamber portion, each of the legs sets comprising a pair of legs.

10. The appliance of claim 1 additionally comprising a smoking material holding tray mounted in the heating chamber adjacent to the heating element.

11. The appliance of claim 1 additionally comprising control means for controlling the supply of power to the heating element of the heating apparatus.

12. The appliance of claim 11 wherein the control means includes temperature detection means for detecting the temperature of a food item located in the heating chamber.

13. The appliance of claim 12 wherein the temperature detection means comprises a temperature probe for inserting in the food item.

14. The appliance of claim 1 wherein the shield is positioned in the heating chamber to block debris from falling onto the heating element.

15. The appliance of claim 1 wherein the shield extends over an entirety of the heating element.

16. The appliance of claim 1 wherein the shield extends in horizontal directions beyond a horizontal extent of the heating element.

17. A food heating appliance comprising:
a chamber portion defining a heating chamber with an upper opening into the heating chamber, the chamber portion including a perimeter wall extending about the heating chamber;
a lid portion for selectively closing the upper opening of the chamber portion; and
a heating apparatus positioned in the heating chamber for heating the heating chamber, the heating apparatus comprising:
a heating element positioned in the heating chamber adjacent to the perimeter wall, and
a shield positioned above the heating element to block debris from falling on the heating element;
wherein the heating element of the heating apparatus is mounted on the perimeter wall of the chamber portion.

18. The appliance of claim 17 wherein the shield of the heating apparatus is mounted on the perimeter wall of the chamber portion at a location above the heating element.

19. A food heating appliance comprising:
a chamber portion defining a heating chamber with an upper opening into the heating chamber, the chamber portion including a perimeter wall extending about the heating chamber;
a lid portion for selectively closing the upper opening of the chamber portion;
a heating apparatus positioned in the heating chamber for heating the heating chamber, the heating apparatus comprising:
a heating element positioned in the heating chamber adjacent to the perimeter wall, and
a shield positioned above the heating element to block debris from falling on the heating element; and
a drip collection tray positioned in the heating chamber;
wherein the drip collection tray has a perimeter edge positioned adjacent to the perimeter wall of the chamber portion, the perimeter edge of the drip collection tray being spaced from the perimeter wall of the chamber portion to permit air to move between the perimeter edge of the drip collection tray and the perimeter wall.

* * * * *